US012707357B2

(12) United States Patent
Fujishiro

(10) Patent No.: US 12,707,357 B2
(45) Date of Patent: Aug. 11, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 470 days.

(21) Appl. No.: 18/298,924

(22) Filed: Apr. 11, 2023

(65) Prior Publication Data

US 2023/0254745 A1 Aug. 10, 2023

Related U.S. Application Data

(63) Continuation of application No. PCT/JP2021/037139, filed on Oct. 7, 2021.

(30) Foreign Application Priority Data

Oct. 12, 2020 (JP) ................................ 2020-171978

(51) Int. Cl.
*H04W 36/00* (2009.01)
*H04W 36/08* (2009.01)
*H04W 36/36* (2009.01)

(52) U.S. Cl.
CPC ........... *H04W 36/08* (2013.01); *H04W 36/36* (2013.01)

(58) Field of Classification Search
CPC ..... H04W 48/18; H04W 48/20; H04W 36/08; H04W 48/10; H04W 36/24; H04W 48/16
See application file for complete search history.

(56) References Cited

U.S. PATENT DOCUMENTS

| | | | |
|---|---|---|---|
| 11,337,124 | B2 | 5/2022 | Tamura et al. |
| 11,611,912 | B2 | 3/2023 | Han et al. |
| 2020/0037234 | A1 | 1/2020 | Bulakci et al. |

(Continued)

FOREIGN PATENT DOCUMENTS

| | | | |
|---|---|---|---|
| CN | 109246775 | A | 1/2019 |
| EP | 3627863 | A1 | 3/2020 |

(Continued)

OTHER PUBLICATIONS

Google, "Basic requirements for RAN slicing", 3GPP TSG-RAN WG2 Meeting#111e, R2-2007607, Online, Aug. 17-28, 2020, [retrieval date, Dec. 7, 2021], internet <URL:https://www.3gpp.org/ ftp/TSG_RAN/WG2_RL2/TSGR2_111-e/Docs/R2-2007607.zip>.

(Continued)

*Primary Examiner* — Shukri Taha
(74) *Attorney, Agent, or Firm* — Studebaker Brackett PLLC

(57) ABSTRACT

In an embodiment, a communication control method is a communication control method used in a mobile communication system, the mobile communication system including a user equipment and a base station apparatus and being configured to perform wireless communication between the user equipment and the base station apparatus. The communication control method includes acquiring, by a first layer of the user equipment, slice information of a cell in which the user equipment exists, the slice information being transmitted from the base station apparatus, and notifying, by the first layer of the user equipment, a second layer of the user equipment of the slice information, the second layer being positioned higher than the first layer.

3 Claims, 14 Drawing Sheets

(56) References Cited

U.S. PATENT DOCUMENTS

| | | | | |
|---|---|---|---|---|
| 2020/0059987 | A1 | 2/2020 | Hong et al. | |
| 2020/0107378 | A1* | 4/2020 | Velev | H04W 48/08 |
| 2020/0120547 | A1* | 4/2020 | Han | H04W 36/0083 |
| 2020/0314732 | A1 | 10/2020 | Park et al. | |
| 2023/0056855 | A1* | 2/2023 | Jiang | H04W 36/302 |
| 2023/0156583 | A1* | 5/2023 | Murray | H04W 48/20 370/329 |
| 2023/0180069 | A1* | 6/2023 | Liu | H04W 36/0061 370/331 |
| 2023/0209426 | A1* | 6/2023 | Fu | H04W 36/0061 370/331 |
| 2023/0209453 | A1* | 6/2023 | Basu | H04W 48/18 370/328 |
| 2023/0224766 | A1 | 7/2023 | Han et al. | |

FOREIGN PATENT DOCUMENTS

| | | | | |
|---|---|---|---|---|
| JP | 2024026269 | A * | 2/2024 | H04W 48/08 |
| WO | 2017/140342 | A1 | 8/2017 | |
| WO | 2018-190070 | A1 | 10/2018 | |
| WO | WO-2018195825 | A1 * | 11/2018 | H04W 36/26 |
| WO | 2020-030278 | A1 | 2/2020 | |
| WO | WO-2022036542 | A1 * | 2/2022 | H04W 48/12 |
| WO | WO-2025130364 | A1 * | 6/2025 | H04W 24/04 |

OTHER PUBLICATIONS

Xiaomi, "Enhancement on RAN support of network slicing", 3GPP TSG-RAN2#111e, R2-2007521, Online, Aug. 17-28, 2020, [retrieval date, Dec. 7, 2021], internet <URL:https://www.3gpp.org/ftp/TSG_RAN/WG2_RL2/TSGR2_111-e/Docs/R2-2007521.zip>.

3GPP TS 38.300 V16.2.0 (Jul. 2020), Technical Specification Group Radio Access Network; NR; NR and NG-RAN Overall Description; Stage 2 (Release 16), Jul. 2020.

3GPP TR 38.832 V0.1.0 (Aug. 2020), Technical Specification Group RAN; NR; Study on enhancement of Radio Access Network (RAN) slicing (Release 17), Aug. 2020.

CMCC; "Discussion on support of RAN slicing"; 3GPP TSG-RAN WG2 Meeting #111 electronic Online; R2-2007421; Aug. 17-28, 2020; 5 pages.

Intel Corporation; "Slice based cell reselection"; 3GPP TSG-RAN WG2 Meeting #101; R2-1802958 ; Feb. 26-Mar. 2, 2018; 3 pages; Athens, Greece.

CMCC (Moderator); "Summary of offline discussion on slicing grouping and priority"; 3GPP TSG-RAN WG3 Meeting #116-e; R3-223792; Online; May 9-19, 2022; total 24 pages.

ZTE Corporation, Sanechips; "Discussion on slice-aware cell reselection"; 3GPP TSG-RAN WG2 Meeting #115-e; R2-2107730; Electronic; Aug. 9-27, 2021; total 11 pages.

* cited by examiner

COMMUNICATION CONTROL METHOD

RELATED APPLICATIONS

The present application is a continuation based on PCT Application No. PCT/JP2021/037139, filed on Oct. 7, 2021, which claims the benefit of Japanese Patent Application No. 2020-171978 filed on Oct. 12, 2020. The content of which is incorporated by reference herein in their entirety.

TECHNICAL FIELD

The present disclosure relates to a communication control method used in a mobile communication system.

BACKGROUND OF INVENTION

In standards of the Third Generation Partnership Project (3GPP), which is a standardization project for mobile communication systems, network slicing (or network slice) has been defined (for example, see Non-Patent Document 1).

Network slicing is a concept that allows differentiated processing in accordance with each customer requirements. Network slicing is also a technique for virtually slicing a network so as to efficiently provide the network in accordance with requirements of services used by customers.

The network slice is composed of parts of a radio access network (RAN) and a core network (CN). Each network slice is identified by a Single-Network Slice Selection Assistance Information (S-NSSAI).

For example, a network slice can be constructed for each service such as enhanced Mobile Broad Band (eMBB: high speed and large capacity). This allows, for example, the network to provide the user with a network slice that matches each service.

Note that, in the 3GPP, studies are underway of a technique in which a plurality of different slices can be supported at different frequencies and in which a plurality of different slices can be supported at the same frequency in different regions (see, for example, Non-Patent Document 2).

CITATION LIST

Non-Patent Literature

Non-Patent Document 1: 3GPP TS 38.300 V16.2.0 (2020-07)

Non-Patent Document 2: 3GPP TR 38.832 V0.1.0 (2020-08)

SUMMARY

In a first embodiment, a communication control method is a communication control method used in a mobile communication system, the mobile communication system including a user equipment and a base station apparatus and being configured to perform wireless communication between the user equipment and the base station apparatus. The communication control method includes acquiring, by a first layer of the user equipment, slice information of a cell in which the user equipment exists, the slice information being transmitted from the base station apparatus, and notifying, by the first layer of the user equipment, a second layer of the user equipment of the slice information, the second layer being positioned higher than the first layer.

In a second embodiment, a communication control method is a communication control method used in a mobile communication system, the mobile communication system including a user equipment and a base station apparatus and being configured to perform wireless communication between the user equipment and the base station apparatus. The communication control method includes notifying, by a second layer of a user equipment, a first layer of the user equipment of an intended slice, the second layer being positioned higher than the first layer, and performing, by the first layer of the user equipment, predetermined processing.

In a third embodiment, a communication control method is a communication control method used in a mobile communication system, the mobile communication system including a user equipment and first and second base station apparatuses and being configured to perform wireless communication between the user equipment and the first and second base station apparatuses. The communication control method includes broadcasting, by a second base station apparatus, slice information supported by a first base station apparatus adjacent to the second base station apparatus. The communication control method includes acquiring, by a user equipment, the slice information supported by the first base station apparatus.

In a fourth embodiment, a communication control method is a communication control method used in a mobile communication system, the mobile communication system including a user equipment and a base station apparatus and being configured to perform wireless communication between the user equipment and the base station apparatus. The communication control method includes broadcasting, by a base station apparatus, a cell reselection priority for each network slice, and performing, by a user equipment, cell reselection by using the cell reselection priority.

In a fifth embodiment, a communication control method is a communication control method used in a mobile communication system, the mobile communication system including a user equipment and a base station apparatus and being configured to perform wireless communication between the user equipment and the base station apparatus. The communication control method includes preferentially selecting, by a user equipment, a cell supporting a network slice the user equipment having accessed before RRC (Radio Resource Control) reestablishment, at a time of cell selection when the user equipment performs the RRC reestablishment, and accessing, by the user equipment, the selected cell.

DESCRIPTION OF EMBODIMENTS

According to an embodiment, a mobile communication system is described with reference to the drawings. In the description of the drawings, the same or similar parts are denoted by the same or similar reference signs.

Configuration of Mobile Communication System

First, in an embodiment, a configuration example of a mobile communication system is described. While the mobile communication system is a 3GPP 5G system in an embodiment, Long Term Evolution (LTE) may be at least partially applied to the mobile communication system. Application to a future wireless communication system such as 6G may be possible.

Figure 1:
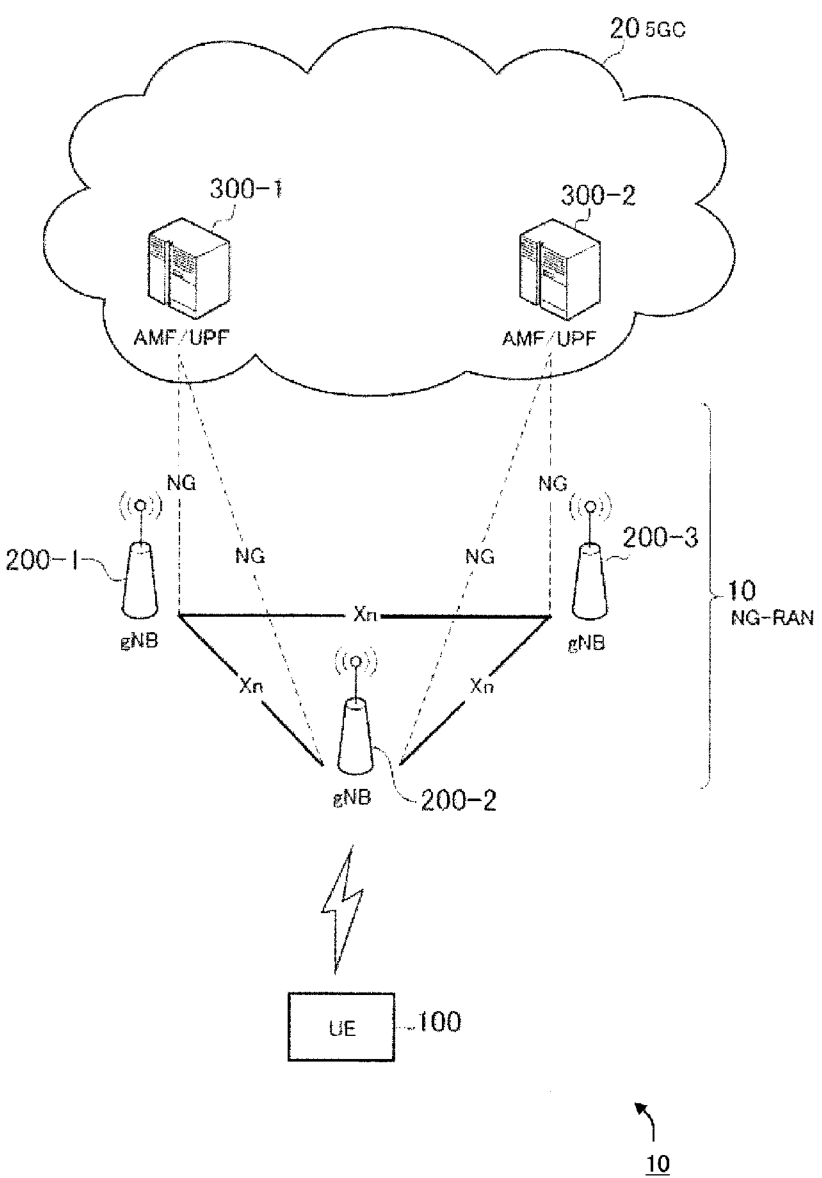
FIG. 1 is a diagram illustrating a configuration example of a mobile communication system according to an embodiment.

FIG. 1 is a diagram illustrating a configuration example of a mobile communication system 1 according to an embodiment.

As illustrated in FIG. 1, the mobile communication system 1 includes a user equipment (UE) 100 and a 5G radio access network (NG-RAN) 10.

The UE 100 is a mobile apparatus. The UE 100 may be any apparatus as long as the apparatus is used by a user. Examples of the UE 100 include apparatuses that can perform wireless communication, such as a mobile phone terminal (including a smartphone), a tablet terminal, a laptop PC, a communication module (including a communication card or a chip set), a sensor, an apparatus provided on a sensor, a vehicle, an apparatus provided on a vehicle (Vehicle UE), a flying object, and an apparatus provided on a flying object (Aerial UE).

The NG-RAN includes 10 a base station apparatuses (hereinafter, also referred to as "base stations" in some cases) 200-1 to 200-3 referred to as "gNB" ("next generation Node B") in the 5G system. The gNBs 200-1 to 200-3 may also be referred to as NG-RAN nodes. The gNBs 200-1 to 200-3 are connected to each other via an Xn interface which is an inter-base station interface. Each of the gNB 200-1 to 200-3 manages one or a plurality of cells. The respective gNBs 200-1 to 200-3 perform wireless communications with the UE 100 that has established a connection to the cells of the gNBs 200-1 to 200-3 themselves. Each of the gNBs 200-1 to 200-3 has a radio resource management (RRM) function, a function of routing user data (hereinafter simply referred to as "data"), and/or a measurement control function for mobility control and scheduling, or the like. The "cell" is used as a term representing a minimum unit of wireless communication area. The "cell" is also used as a term representing a function or a resource for performing wireless communication with the UE 100. One cell belongs to one carrier frequency. Note that, in the present embodiment, "cell" and "base station apparatus" or "cell" and "gNB" may be used without being distinguished from each other.

Note that the gNBs 200-1 to 200-3 may be connected to an Evolved Packet Core (EPC) which is a core network of LTE, and/or a base station of LTE may be connected to a 5GC 20. The base station of LTE may be connected with the gNBs 200-1 to 200-3 via the inter-base station interface.

The 5GC 20 includes an Access and Mobility Management Function (AMF) and User Plane Function (UPF) 300. The AMF performs various types of mobility controls and the like for the UE 100. The AMF manages information of an area in which the UE 100 exists by communicating with the UE 100 by using Non-Access Stratum (NAS) signaling. The UPF controls data transfer. The AMF and UPF 300 are connected to the gNBs 200-1 to 200-3 via an NG interface which is an interface between the base station and the core network.

Note that in the following description, the gNBs 200-1 to 200-3 may be referred to as the gNB 200. The AMF of the AMF and UPF 300 may be referred to as the AMF 300.

Figure 2:
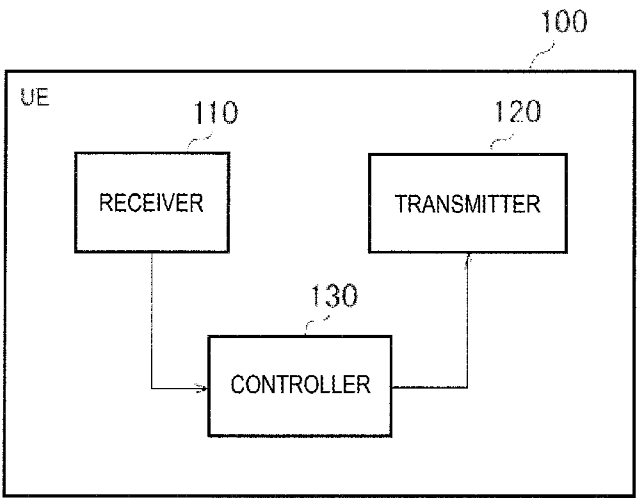
FIG. 2 is a diagram illustrating a configuration example of a user equipment according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts (down-converts) a radio signal received through the antenna into a baseband signal (a received signal) and outputs the resulting signal to the controller 130.

The transmitter 120 performs various types of transmission under control of the controller 130. The transmitter 120 includes an antenna and a transmission device. The transmission device converts (up-converts) a baseband signal output by the controller 130 (a transmission signal) into a radio signal and transmits the resulting signal through the antenna.

The controller 130 performs various types of control in the UE 100. The controller 130 includes at least one processor and at least one memory electrically connected to the processor. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The CPU may be replaced by a processor or a controller, such as a digital signal processor (DSP) or a field programmable gate array (FPGA). In the present embodiment, the controller 130 can perform various types of control or processing described in the following examples.

Figure 3:
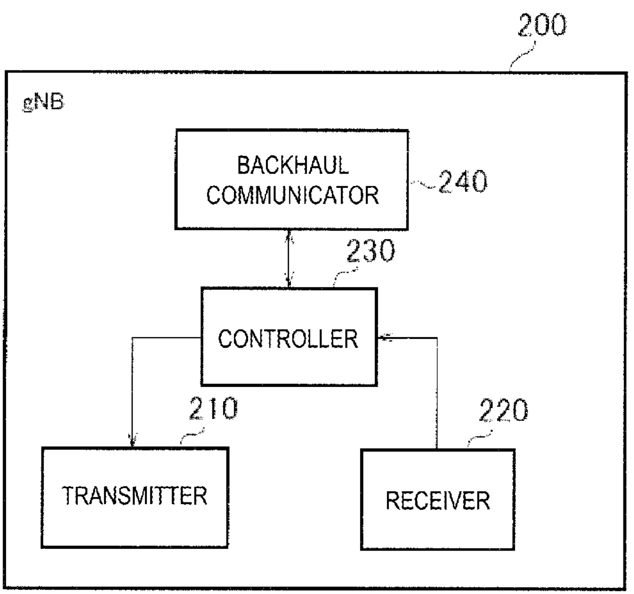
FIG. 3 is a diagram illustrating a configuration example of a base station apparatus according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts (up-converts) a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts (down-converts) a radio signal received through the antenna into a baseband signal (a received signal) and outputs the resulting signal to the controller 230.

The controller 230 performs various types of controls for the gNB 200. The controller 230 includes at least one processor and at least one memory electrically connected to the processor. The memory stores a program to be executed by the processor and information to be used for processing by the processor. The baseband processor performs modulation and demodulation, coding and decoding, and the like of a baseband signal. The CPU executes the program stored in the memory to thereby perform various types of processing. Instead of the CPU, a processor or a controller such as a DSP or an FPGA may be used. In the present embodiment, the controller 230 can perform various types of control or processing described in the following examples.

The backhaul communicator 240 is connected to a neighboring base station via the inter-base station interface. The backhaul communicator 240 is connected to each node of the 5GC 20 via the interface between the base station and the core network. Note that the gNB 200 may include a Central Unit (CU) and a Distributed Unit (DU) (i.e., functions are divided), and the two units may be connected via an F1 interface.

Protocol Stack in Radio Interface

Figure 4:
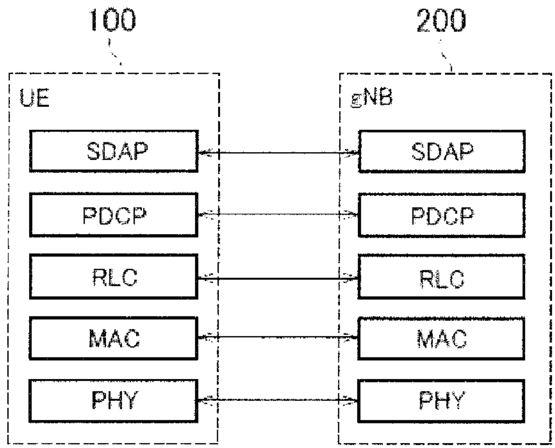
FIG. 4 is a diagram illustrating a configuration example of a protocol stack of a user plane of a radio interface.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an access stratum (AS). Note that, when the RAN is connected to the EPC, the SDAP may not be provided.

Figure 5:
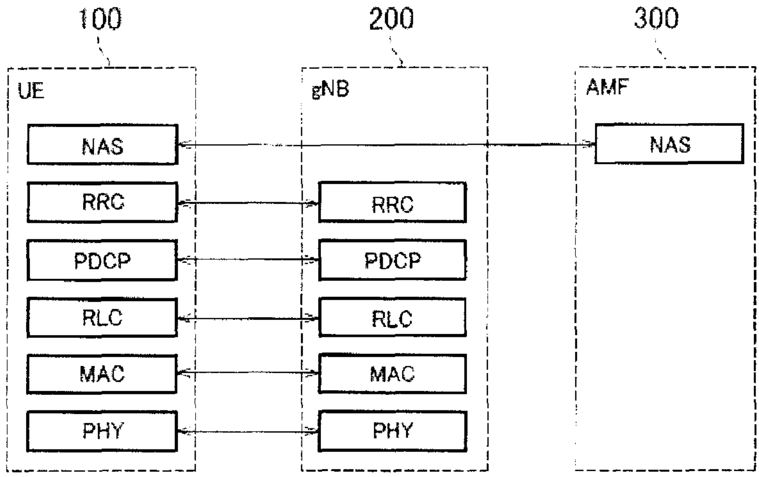
FIG. 5 is a diagram illustrating a configuration example of a protocol stack of a control plane of a radio interface.

FIG. 5 is a diagram illustrating a configuration of a protocol stack of a radio interface of a control plane handling signaling (control signal). As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel in accordance with establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the RRC connection is suspended, the UE 100 is in an RRC inactive state.

The NAS layer which is higher than the RRC layer performs session management, mobility management, and the like. NAS signaling is transmitted between the NAS layer of the UE 100 and the NAS layer of the AMF 300.

Note that the UE 100 includes an application layer other than the protocol of the radio interface.

Operation Example

Next, Operation examples are described. The operation examples are described in the following order.

(Example 1) In the UE 100, slice information of a cell in which the UE 100 exists is notified from the AS layer to the higher layer (NAS or the like).

(Example 2) In the UE 100, the higher layer notifies the AS layer of an intended slice.

(Example 3) In the UE 100, the AS layer searches for and reselects a cell supporting the intended slice notified from the higher layer.

(Example 4) The UE 100 notifies the gNB 200 of the intended slice.

(Example 5) A cell broadcasts (or notifies) slice information supported by a neighboring cell.

(Example 6) The gNB 200-1 notifies the adjacent gNB 200-2 of slice information the gNB 200-1 supports.

(Example 7) The AMF 300 notifies the gNB 200 of the slice information supported by the neighboring cell.

(Example 8) A serving cell broadcasts (or notifies) cell reselection priority for each slice.

(Example 9) In cell selection at the time of RR reestablishment, the UE 100 preferentially selects a cell supported by the slice the UE 100 is being accessing.

Example 1

Figure 6:
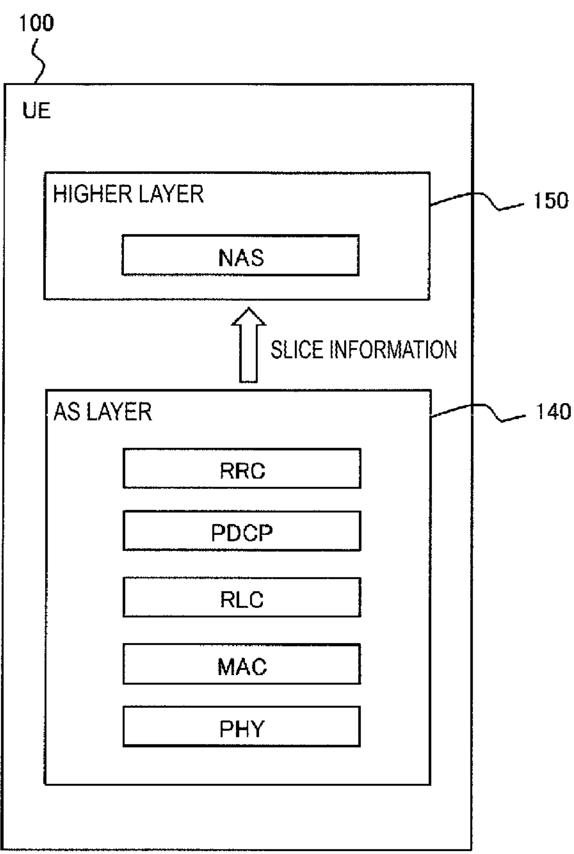
FIG. 6 is a diagram illustrating an example of a relationship between an AS layer and a higher layer.

FIG. 6 is a diagram illustrating an example of a relationship between the AS layer 140 and the higher layer 150 in the UE 100. As illustrated in FIG. 6, the UE 100 includes the AS layer 140 and the higher layer 150 that is higher than the AS layer 140.

The AS layer 140 and the higher layer 150 include the layers of the control plane of the radio interface illustrated in FIG. 5. In other words, the AS layer 140 includes a PHY layer, a MAC layer, an RLC layer, a PDCP layer, and an RRC layer. The higher layer 150 includes a NAS layer. In Example 1, as illustrated in FIG. 6, the slice information related to the network slice of the cell in which the UE 100 exist is notified from the AS layer 140 to the higher layer 150. Such processing may be performed, for example, in the controller 130. Note that, hereinafter, the network slice may be referred to as a "slice".

Figure 7A:
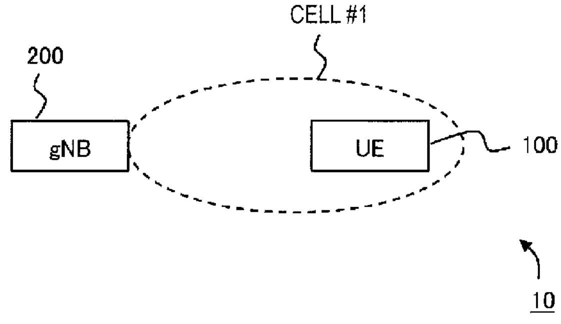
FIG. 7A is a diagram illustrating an example of the mobile communication system.

FIG. 7A is a diagram illustrating an example in which the UE 100 exists in a cell #1 of the gNB 200. In this case, the UE 100 notifies of the slice information for the cell #1 in which the UE 100 exists from the AS layer 140 to the higher layer 150.

The slice information is handled in the NAS layer and managed, for example, in the AMF 300. On the other hand, information related to the cell is handled in the AS layer 140. When the AS layer 140 in the UE 100 receives the slice information for the cell #1, the AS layer 140 notifies the higher layer 150 of the slice information, so that the higher layer 150 (or the NAS layer) can grasp the slice information for each cell.

Figure 7B:
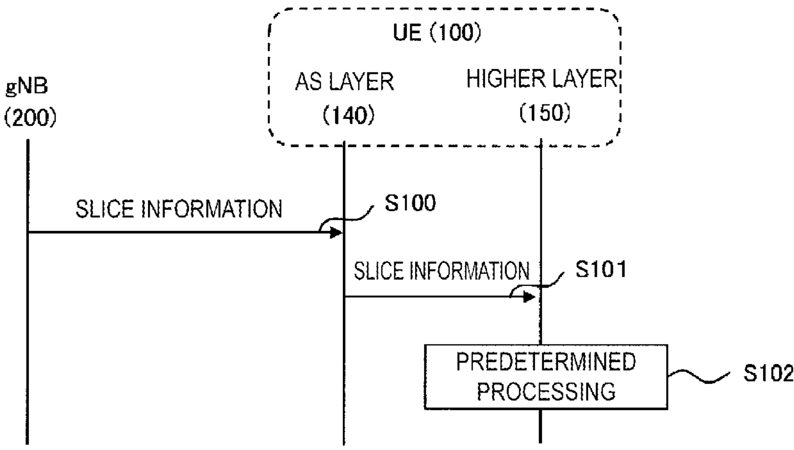
FIG. 7B is a diagram illustrating an operation example of Example 1.

FIG. 7B is a diagram illustrating an operation example in Example 1.

In step S100, the UE 100 in an idle state or an inactive state acquires the slice information related to the slice supported in the cell of the gNB 200 in which the UE 100 exists (the cell #1 in the example of FIG. 7A).

The slice information may be included in a system information block (SIB) and broadcast, or may be included in an RRC message and transmitted to the UE 100. The slice information may include S-NSSAI or may include a human readable identifier such as "eMBB". The UE 100 in the RRC connected state may receive the slice information.

In step S101, the AS layer 140 notifies the higher layer 150 of the slice information. Examples of a trigger for the AS layer 140 to notify the higher layer 150 include the following.

Specifically, when the UE 100 in the idle state or the inactive state performs cell selection or cell reselection, the AS layer 140 may notify the higher layer 150 of the slice information. When handover is performed in the UE 100 in the RRC connected state, the AS layer 140 may notify the higher layer 150 of the slice information. When the slice information supported by the cell is changed, the AS layer 140 may notify. When the previously notified slice information is different from the current slice information (or the slice information currently acquired from the gNB 200), the AS layer 140 may notify. The AS layer 140 may notify periodically (or at a constant cycle).

In step 102, the higher layer 150 performs predetermined processing. The predetermined processing includes the following, for example.

Specifically, the higher layer 150 may notify the application layer of the currently supportable slice information. In this case, the higher layer 150 may select the supportable slice information from among one or more pieces of slice information notified in step S101 and notify the selected slice information. The higher layer 150 (or the controller 130) may display slice coverage information on a display of the UE 100. As the slice coverage information, for example, a supported service name such as "5G URLLC" may be displayed beside an antenna mark on the display. The slice coverage information may be displayed in a setting field. The higher layer 150 may notify the AS layer 140 of the intended slice. Details of the above is described in Example 2.

Example 2

Example 2 is an example in which the higher layer 150 of the UE 100 notifies the AS layer 140 of the intended slice.

The intended slice may be a slice that is expected to be used in the UE 100, a candidate slice, or a desired slice. For example, the higher layer 150 notifying the AS layer 140 of such slices allows the AS layer 140 to perform various processes such as cell reselection processing.

Figure 8A:
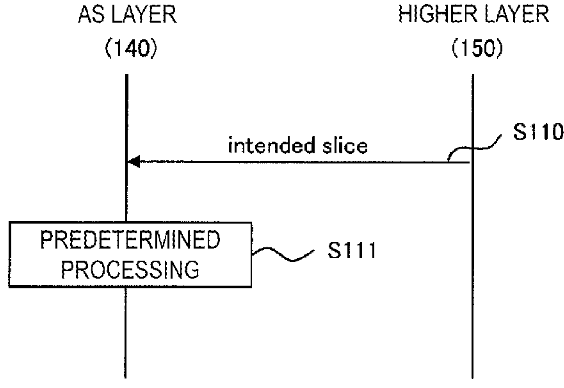
FIGS. 8A and 8B are diagrams illustrating operation examples of Examples 2 and 3, respectively.

FIG. 8A is a diagram illustrating an operation example in Example 2.

In step S110, the higher layer 150 notifies the AS layer 140 of the intended slice.

The intended slice to be notified may be in a form of list of a plurality of intended slices. In this case, for example, in the UE 100, there may be a plurality of slices used (or requested) by installed or active applications, and these slices may be in a form of list. For example, a plurality of intended slices permitted (or authenticated) by the CN may exist, and these slices may be in a form of list.

When a plurality of intended slices exist, a priority of each intended slice may be further notified. The higher layer 150 may indicate, to the AS layer 140, search for the intended slice by using the cell reselection or the like. Details of the above is described in Example 3. When the higher layer 150 receives an inquiry (a request such as an information provision request) from the AS layer 140, the higher layer 150 may notify the AS layer 140 of the intended slice. In this case, the AS layer 140 may make an inquiry about the intended slice to the higher layer 150, for example, at the time of the cell reselection or at the time of changing the slice information supported by the cell.

Note that the intended slice may be created in the higher layer 150. The intended slice may be transmitted from the AMF 300 to the higher layer 150.

In step S111, the AS layer 140 performs predetermined processing. The predetermined processing includes the following, for example.

Specifically, the AS layer 140 may check whether the notified intended slice is supported in the cell in which the UE 100 exists. In this case, the AS layer 140 may notify the NAS layer (or the higher layer 150) of "IN" if supported or "OUT" if not supported. In the UE 100 in the idle state or the inactive state, the AS layer 140 may perform the cell reselection when the notified intended slice is not supported in the cell in which the UE 100 exists. Details of the above is described in Example 3. On the other hand, in the UE 100 in the RRC connected state, when the notified intended slice is not supported in the cell in which the UE 100 exists, the AS layer 140 may transmit the intended slice to the gNB 200. Details of the above is described in Example 4.

Example 3

Example 3 is an example in which in the UE 100 in the idle state or the inactive state, the AS layer 140 searches for a cell supporting the intended slice notified from the higher layer 150 and performs the cell reselection.

The UE 100, by searching for and reselecting such a cell, can access a slice providing a service desired by the UE 100 and receive such a service via the accessed slice, for example.

Figure 8B:
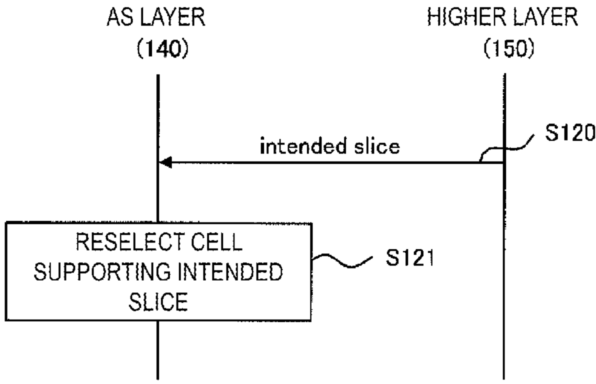

FIG. 8B is a diagram illustrating an operation example of Example 3.

In step S120, the AS layer 140 is notified of the intended slice from the higher layer 150.

In step S121, the AS layer 140, in existing in a cell not supporting the notified intended slice, performs the cell reselection processing.

The AS layer 140 may perform the cell reselection processing when a cell search is indicated from the NAS layer. Such an indication may be notified together with the intended slice in step S120, for example. In the cell reselection processing, the AS layer 140 may preferentially reselect (or select) the cell supporting the intended slice. In this case, for example, the AS layer 140 attempts to select a cell having the best radio quality (such as RSRP (Reference Signal Received Power)) from among the cells supporting the intended slice (Ranking). If such a cell does not exist, the AS layer 140 reselects a cell not supporting the intended slice. For example, the AS layer 140 performs the cell reselection with the highest priority on the cell supporting the intended slice and/or a frequency supporting the intended slice. In this case, changing processing may be performed on the priorities of the cell or frequency through reselection priorities handling. The AS layer 140 may notify the NAS layer of whether the cell search of the intended slice is succeeded. In this case, for example, the AS layer 140 may notify only success or failure. For example, the AS layer 140 may notify the slice information of the cell after the reselection.

Example 4

Example 4 is an example in which the UE 100 transmits the intended slice to the gNB 200. For example, the slice supported in the cell in which the UE 100 exists may not be the slice the UE 100 desires, and the UE 100 may desire another slice. In such a case, the UE 100 transmits the intended slice to the gNB 200 at appropriate timing. This allows the gNB 200 to hand over the UE 100 to the cell supporting the slice desired by the UE 100 to enable the UE 100 to receive the desired service, for example. Note that as an example of the predetermined processing in Example 2 (step S111 in FIG. 8A), the UE 100 may transmit the intended slice to the gNB 200.

Figure 9:
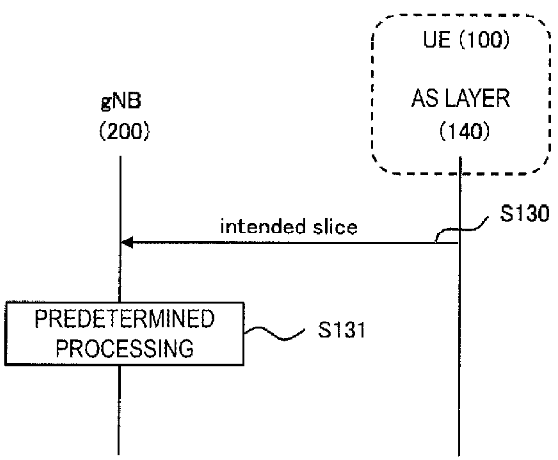
FIG. 9 is a diagram illustrating an operation example of Example 4.

FIG. 9 is a diagram illustrating an operation example of Example 4.

In step S130, the UE 100 in the RRC connected state with the gNB 200 transmits the intended slice to the gNB 200. A trigger for transmitting the intended slice may be the following, for example.

Specifically, when the AS layer 140 of the UE 100 receives a notification of the intended slice from the higher layer 150, the UE 100 (or the AS layer 140) may transmit the intended slice to the gNB 200. When the slice the UE 100 accesses is changed (or has been changed), the UE 100 may transmit the intended slice to the gNB 200. When the intended slice is changed, the UE 100 may transmit the intended slice to the gNB 200. Situations represented by the phrase "when the intended slice is changed" include, for example, when an initial connection of the RRC connection occurs, or when notification contents of the intended slice transmitted last time. When the UE 100 is provided with information (or receives an inquiry) from the gNB 200, for example, when the UE 100 receives a request from the gNB 200, the UE 100 may transmit the intended slice to the gNB 200. When a handover is expected (or performed), for example, when a measurement report is triggered, the UE 100 may transmit the intended slice to the gNB 200. The notification, if permitted (configured) by the gNB 200 in advance, may be made.

However, these transmission triggers may have the following restrictions, for example. Specifically, (only) when the slice supported by the cell (in which the UE 100 exists) does not match the intended slice (or when the UE 100 intends the slice not supported), the UE 100 may transmit the intended slice to the gNB 200. In this case, for example, the intended slice may be transmitted to encourage the gNB 200 to perform handover to the cell supporting the slice intended by the UE 100. (Only) when the slices supported by the cell matches the intended slice (or all intended slices are supported), the UE 100 may transmit the intended slice to the gNB 200. In this case, for example, the intended slice may be transmitted to the gNB 200 when the UE 100 enters (or selects or is handed over to) the cell supporting the desired slice.

The contents of the message transmitted in step S130 may be the following, for example. Specifically, the UE 100 may transmit the slice information in which the intended slice is represented in a form of list to the gNB 200. Such slice information may include all of the intended slices in the UE 100 and may be transmitted. The slice information may include (only) the intended slice that matches the slice supported by the cell, or may include (only) the intended slice that does not match the slice supported by the cell.

The message used for transmission in the step S130 may be the following, for example. Specifically, the UE 100 may include the intended slice in the UE assistance information message to be transmitted the gNB 200. In this case, the UE 100 may include information such as (a list of) the intended slice, the priorities (or whether prioritization is desired), and whether to (expect in the future to) access the slice (or the intended slice) within a certain period in the UE assistance information to be transmitted. The UE 100 may include the intended slice in a measurement report message to be transmitted to the gNB 200. In this case, the UE 100 may transmit the measurement report message in which the measurement result of each cell is associated with the intended slice to include the slice information supported by the cell, matching with (or whether to match) the intended slice of the UE 100, and preference of the UE 100 (preference indicating a desire "to target this cell if possible").

In step S131, the gNB 200 performs predetermined processing for the UE 100. The predetermined processing may include the following, for example.

Specifically, when the intended slice is not supported in the cell in which the UE 100 exists, the gNB 200 may hand over the UE 100 to a cell supporting the intended slice. Such handover allows the UE 100 to receive a desired service from the cell supporting the intended slice, for example. The gNB 200 may transmit information indicating that the intended slice is not supported in the area (or the cell) to the UE 100. In this case, when the intended slice is not supported in any of the neighboring cell, which may be transmitted by the gNB 200 to the UE 100.

Example 5

Example 5 is an example in which the cell broadcasts or transmits the slice information supported by the neighboring cell.

For example, when performing the cell reselection described in Example 3 or the like, the UE 100 may search for cells at all supported frequencies and read the SIB, or the like to confirm the slice supported for each cell. In such a case, the UE 100 confirms the slice supported for each cell, so power consumption increases.

The gNB 200 broadcasts the slice information of the neighboring cell, for example. This allows the UE 100 to acquire the slice information of the neighboring cell, which eliminates the processing of confirming the slice of the neighboring cell at the time of the cell search, reducing the power consumption.

Figure 10A:
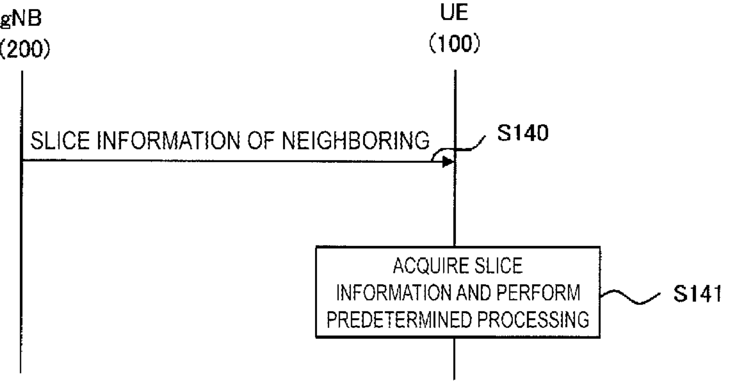
FIG. 10A is a diagram illustrating an operation example of Example 5.

FIG. 10A is a diagram illustrating an operation example of Example 5.

In step S140, the gNB 200 (including the serving cell for the UE 100) broadcasts the slice information supported by the neighboring cell.

Figure 10B:
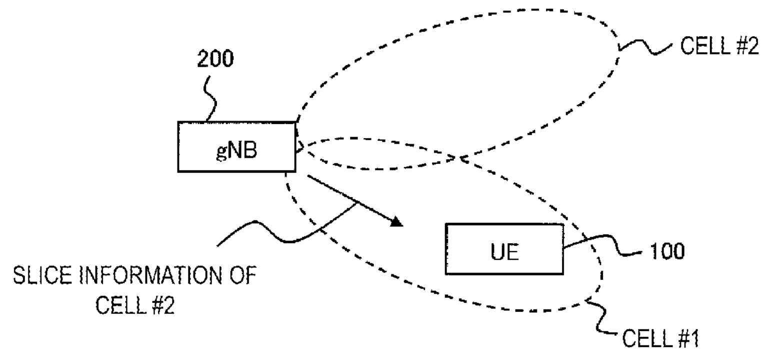
FIG. 10B is a diagram illustrating an example of transmission of slice information.
Figure 11:
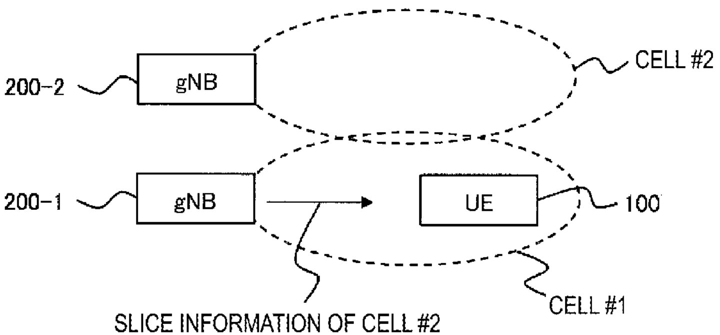
FIG. 11 is a diagram illustrating an example of transmission of the slice information.

FIG. 10B and FIG. 11 are diagrams each illustrating an example of a relationship between the serving cell and the neighboring cell. In FIG. 10B, the UE 100 exists in the cell #1 of gNB 200, and the cell #1 is the serving cell. In this case, the gNB 200 broadcasts the slice information supported by the cell #2 neighboring the cell #1. In FIG. 11, the cell #1 of the gNB 200-1 is the serving cell of UE 100, and the cell #2 of the gNB 200-2 neighboring the gNB 200-1 is a neighboring cell near the cell #1. The gNB 200-1 broadcasts the slice information of the cell #2 of the gNB 200-1.

Note that when CA (carrier aggregation) or DC (dual connectivity) is not configured, the primary cell is the serving cell for the UE 100 in the RRC connected state. When CA or DC is configured, the serving cell is used for the UE 100 in the RRC connected state in order to express a set of cells including a special cell and all secondary cells.

The gNB 200 broadcasts the slice information using the SIB. However, the gNB 200 may also transmit the slice information supported by the neighboring cell through dedicated signaling. Examples of the dedicated signaling may include an RRC reconfiguration message used when the RRC connection is changed. The gNB 200 may broadcast the supported slice information in association with a cell ID (identification) (and/or gNB ID). The gNB 200 may broadcast the slice information in association with information on guaranteed service requirement. Examples of the service requirement information may include the following, for example.

Specifically, as for the eMBB, the service requirement information is the maximum and/or average throughput (or bit rate) or the like. As for URLLC (Ultra Reliable and Low Latency Communications), the service requirement information is the maximum latency, the maximum packet loss, or synchronization (or reference) clock accuracy, or the like. As for mMTC (Massive Machine Type Communication), the service requirement information is the maximum number of connections, the remaining capacity (the number of remaining connections allowed), and the like. The service requirement information may be indicated by a supported 5QI (5G QoS (Quality of Service) Indicator) (or QoS information). For example, the service requirement information may be information of the service requirement indicated by the 5QI regarding up to which QoS level is supportable and up to which QoS bearer is supportable.

Referring back to FIG. 10A, in step S141, the UE 100 acquires the slice information of the neighboring cell and performs predetermined processing. The predetermined processing may include the following, for example.

Specifically, the UE 100 may perform the cell reselection process described in Example 3. The UE 100 may notify the gNB 200. When the AS layer 140 in the UE 100 reselects a cell not supporting the intended slice, the AS layer 140 may notify the higher layer 150 of the slice information of the neighboring cell. In this case, for example, the higher layer (application layer or the like) 150 may display a warning (to the user) that the slice is out of coverage on the display.

Example 6

Example 6 is an example in which the gNB 200-1 transmits the slice information the gNB 200-1 supports to the adjacent gNB 200-2.

Example 5 describes the example in which the serving cell (or the gNB 200) performs broadcasting or the like of the slice information of the neighboring cell. The gNB 200-1 transmits the slice information the gNB 200-1 supports to the adjacent gNB 200-2. This allows the adjacent gNB 200-2 to perform broadcasting or the like of the slice information of the gNB 200-1 that includes the neighboring cell for the gNB 200-2. The UE 100 can acquire the slice information of the gNB 200-1 from the gNB 200-2.

Figure 12A:
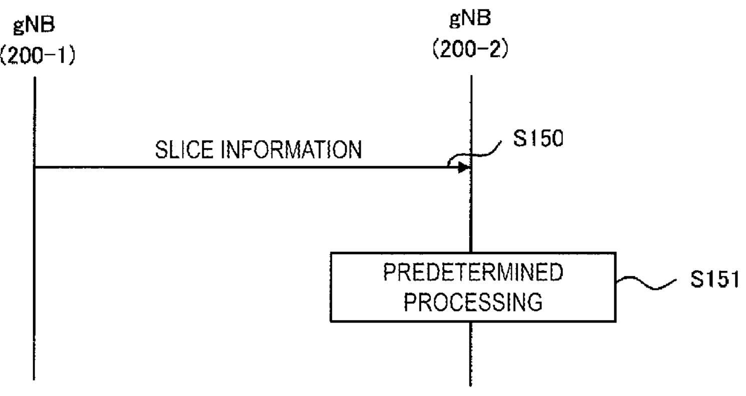
FIGS. 12A and 12B are diagrams illustrating operation examples of Examples 6 and 7, respectively.

FIG. 12A is a diagram illustrating an operation example of Example 6.

In step S150, the gNB 200-1 transmits the slice information the gNB 200-1 supports to the adjacent gNB 200-2.

In this case, the gNB 200-1 may transmit the slice information in association with each cell managed by the gNB 200-1 to the adjacent gNB 200-2. The gNB 200-1 may transmit to the adjacent gNB 200-2 through Xn-AP (Application Protocol) signaling (or a message by the Xn-AP). The Xn-AP is an application protocol in the control plane of the inter-base station Xn interface. The gNB 200-1 may transmit the slice information to the adjacent gNB 200-2 by the following trigger.

Specifically, when the Xn connection is set up, the gNB 200-1 may transmit the slice information to the adjacent gNB 200-2. When the supported slice is changed (or when the configuration of the gNB 200-1 is changed), the gNB 200-1 may transmit the slice information to the adjacent gNB 200-2. When the gNB 200-1 receives a request to provide the slice information from the neighboring cell (or the adjacent gNB 200-2), the gNB 200-1 may transmit the slice information to the adjacent gNB 200-2. The gNB 200-1 may transmit the slice information to the adjacent gNB 200-2 periodically (or at a constant cycle).

In step S151, the gNB 200-1 performs predetermined processing in consideration of the slice information. As the predetermined processing, for example, the slice information of the neighboring cell may be updated, or mobility control may be performed. Examples of the mobility control include the handover processing of the UE 100 described above.

Example 7

Example 7 is an example in which the AMF 300 transmits the slice information supported by the neighboring cell to the gNB 200.

Example 6 or other examples describe that the slice information supported by the neighboring cell is acquired from the adjacent gNB 200-1. Example 7 describes an example in which the gNB 200 acquires from the AMF 300. This allows the gNB 200 to perform broadcasting or the like of the slice information supported by the neighboring cell described in Example 5, for example.

Figure 12B:
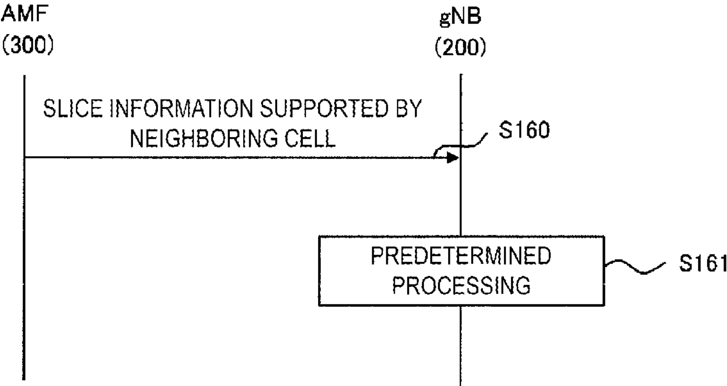

FIG. 12B is a diagram illustrating an operation example of Example 7.

In step S160, the AMF 300 transmits the slice information supported by the (neighboring) gNB 200-2 that is subordinate to the AMF 300 to the gNB 200-1 that is subordinate to the AMF 300. In the example of FIG. 11, the cell #2 of the gNB 200-2 is a "neighboring cell" for the cell #1 of the gNB 200-1. In this case, the AMF 300 transmits the slice information supported by the cell #2 (or the gNB 200-2) to the gNB 200-1.

The AMF 300 may transmit the slice information of the neighboring cell to the gNB 200 through NG-AP signaling (or a message by the NG-AP). The trigger for the AMF 300 to transmit the slice information may be identical to the trigger for the gNB 200-1 to transmit the slice information in Example 6. In other words, the AMF 300 may transmit the slice information when an NG connection is set up, when a slice supported by the gNB 200 subordinate to the AMF 300 is changed, when a request for providing the slice information is received from the adjacent gNB 200-2 subordinate to the AFM 300, or may periodically transmit.

Note that the AMF 300 may be configured with the slice information supported by the neighboring cell by, for example, operation administration and maintenance (OAM).

In step S161, the gNB 200 performs predetermined processing. The predetermined processing may be identical to the predetermined processing performed by the adjacent gNB 200-2 receiving the slice information described in Example 6. In other words, the gNB 200 may update the slice information supported by the neighboring cell or may perform mobility control such as handover processing of the UE 100. The AMF 300 may notify the gNB 200 of the slice information the AMF 300 itself (or the network the AMF 300 itself manages) supports. This allows the gNB 200 to appropriately select the AMF 300 (or the core network) supporting the intended slice of the UE 100 (or to perform data-routing of the UE 100).

Example 8

Example 8 is an example in which the cell reselection priority for each (intended) slice is broadcast or transmitted.

The UE 100 performs cell reselection according to the cell reselection priority configured by the cell. However, this may not allow the UE 100 to reliably select a cell supporting the intended slice.

On the other hand, it is also possible to control the selection to the cell supporting the intended slice according to dedicated priority (configured through the RRC). However, when the UE 100 moves to another area (or cell) or when the intended slice of the UE 100 changes, the UE 100 may also disadvantageously not select the cell supporting the intended slice.

It is also conceivable that the UE 100 may perform the cell reselection with the highest priority on the cell or frequency supporting the intended slice. However, in this case, which cell is selected depends on the implementation of the UE 100. For this reason, the control from the network side is not possible.

The gNB 200 perform broadcasting or the like of the cell reselection priority for each slice. This allows the UE 100 to perform the cell reselection using the cell reselection priority designated by the network side, for example. Therefore, access to the cell supporting the intended slice of the UE 100 can be achieved while enabling the network control.

Figure 13:
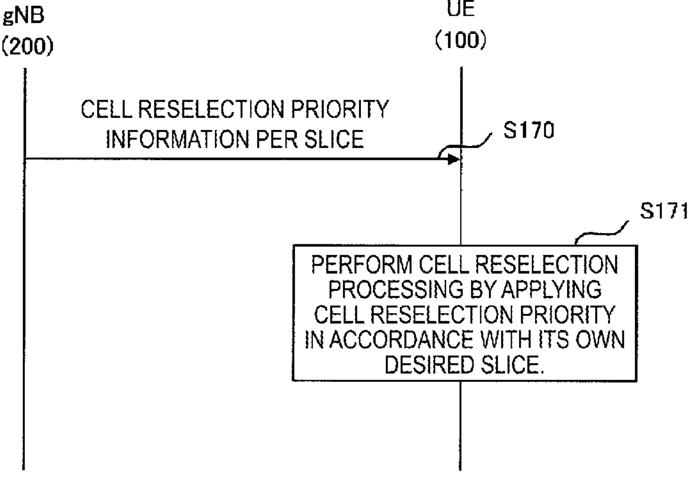
FIG. 13 is a diagram illustrating an operation example of Example 8.

FIG. 13 is a diagram illustrating an operation example of Example 8.

In step S170, the gNB 200 broadcasts or transmits the cell reselection priority for each slice. The gNB 200 may broadcast the cell reselection priority for each slice using the SIB. The gNB 200 may transmit the cell reselection priority for each slice to the UE 100 through dedicated signaling such as an RRC release (RRCRelease) message.

The gNB 200 may broadcast the slice information described in Example 6 in association with (or in connection with) the cell reselection priority (or priority information) of the cell and/or frequency. For example, in the case of the frequency priority, the UE 100 that intends (or desires) an eMBB slice may use a priority of "7" for a frequency f1, a priority of "3" for a frequency f2, and the like, and the UE 100 that intends (or desires) a URLLC slice may use a priority "7" for a frequency f2, a priority "3" for a frequency f1, and the like. For example, in the case of the cell priority, the UE 100 that intends (or desires) an eMBB slice may uses a priority of "7" for the cell #1, a priority of "3" for the cell #2, and the like. In these examples, the larger the number is, the higher the priority is, but a case that the smaller the number is, the higher the priority is may be possible.

Note that the gNB 200 may further broadcast a cell reselection priority (of related art) that is not associated with slice information. In this case, the reselection priority to be broadcast may be used for legacy UE (such as in Rel-15 in 3GPP) or in a UE 100 not having the intended slice.

In step S171, the UE 100 applies the cell reselection priority in accordance with the intended slice of the UE 100 and performs the cell reselection. In this case, the AS layer 140 of the UE 100 may select the cell reselection priority to be applied from among the cell reselection priorities broadcast by using the intended slice notified from the higher layer 150. In this case, when a plurality of intended slices exist, the AS layer 140 may select the cell reselection priority corresponding to the intended slice having the highest slice priority notified from the higher layer 150.

Example 9

Example 9 is an example in which in the cell selection at the time of RRC reestablishment, the UE 100 preferentially selects a cell supporting the slice the UE 100 is being accessing.

When a radio link failure (RLF) occurs while the UE 100 in the RRC connected state is accessing a slice, the UE 100 performs an RRC reestablishment procedure. In the RRC reestablishment procedure, the cell selection is performed. At the time of the cell selection, if the UE 100 selects a cell that does not support the slice the UE 100 has accessed before the RRC reestablishment, disconnection of access to the slice may occur.

In Example 9, the UE 100 preferentially selects, at the time of the cell selection, the cell supporting the slice the UE 100 has accessed before the RRC reestablishment, thereby decreasing the occurrence of the disconnection of access to the slice. The UE 100 is allowed to receive continuous service provision.

Figure 14:
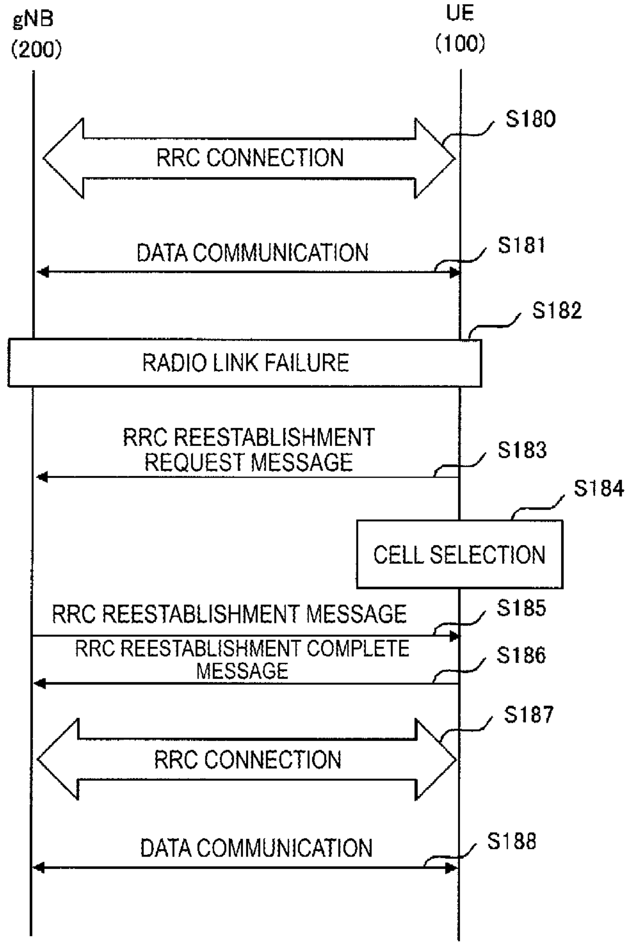
FIG. 14 is a diagram illustrating an operation example of Example 9.

FIG. 14 is a diagram illustrating an operation example of Example 9.

In step S180, the UE 100 and the gNB 200 are connected to each other in RRC connection to be in the RRC connected state.

In step S181, the UE 100 and the gNB 200 perform data communication.

In step S182, a failure occurs in the radio link.

In step S183, the UE 100 starts the RRC reestablishment procedure to transmit an RRC reestablishment request message to the gNB 200.

In step S184, the UE 100 performs the cell selection processing. The UE 100 performs the cell selection using the RRC reestablishment as a trigger. In this case, the UE 100 preferentially selects the cell supporting the slice the UE 100 has accessed before the RRC reestablishment. In other words, the UE 100 may be allowed to prioritize (or select) the cell supporting the slice that the UE 100 accesses. The UE 100 may perform the cell selection processing based on the intended slice notified from the higher layer 150. The UE 100 may perform the cell selection processing by using the slice information of the neighboring cell provided from the (old) serving cell (for example, Example 5). The UE 100 may acquire the slice information provided by the SIB to check the slice information supported for each neighboring cell at the time of the cell search.

In step S185, the UE 100 receives the RRC reestablishment request message.

In step S186, the UE 100 transmits an RRC reestablishment complete message.

In step S187, the UE 100 establishes an RRC connection with the cell (the gNB 200 having the cell) selected in step S184.

In step S188, the UE 100 accesses the selected cell (the gNB 200 having the selected cell) and performs data communication with that cell. The UE 100 can continuously access the slice the UE 100 has accessed before the radio link failure (step S182), and can receive the continuous service provision through the slice.

OTHER EMBODIMENTS

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Although an embodiment has been described in detail with reference to the drawings, a specific configuration is not limited to those described above, and various design modifications and the like can be made without departing from the gist. All of or a part of the examples can be combined together as long as the combination remains consistent.

REFERENCE SIGNS

1: Mobile communication system
10: NG-RAN
20: 5GC
100: UE
110: Receiver
120: Transmitter
130: Controller
140: AS layer
150: Higher layer
200 (200-1 to 200-3): gNB
210: Transmitter
220: Receiver
230: Controller
240: Backhaul communicator
300: AMF

The invention claimed is:

1. A communication control method comprising:

broadcasting, by a base station, system information indicating a first priority of cell reselection for each network slice;

broadcasting, by the base station, information indicating a cell reselection priority that is not associated with a network slice;

receiving, by a user equipment from a core network apparatus, slice information including information identifying a plurality of network slices and information indicating a second priority of each network slice among the plurality of network slices; and performing, by the user equipment, cell reselection, wherein the cell reselection comprises:

determining that a frequency supporting a network slice has higher priority than a frequency not supporting a network slice;

applying to a frequency supporting a network slice with the highest second priority indicated by the slice information, the first priority indicated by the system information corresponding to the network slice; and applying to a frequency not supporting any network slice indicated by the slice information, the cell reselection priority indicated by the information indicating a cell reselection priority that is not associated with a network slice.

2. A user equipment comprising a processor and a memory, the processor configured to:

receive system information indicating a first priority of cell reselection for each network slice from a base station, receive information indicating a cell reselection priority that is not associated with a network slice from the base station, receive from a core network apparatus, slice information including information identifying a plurality of network slices and information indicating a second priority of each network slice among the plurality of network slices, and perform cell reselection, wherein the cell reselection comprises:

determining that a frequency supporting a network slice has higher priority than a frequency not supporting a network slice;

applying to a frequency supporting a network slice with the highest second priority indicated by the slice information, the first priority indicated by the system information corresponding to the network slice; and applying to a frequency not supporting any network slice indicated by the slice information, the cell reselection priority indicated by the information indicating a cell reselection priority that is not associated with a network slice.

3. An apparatus for controlling a user equipment, the apparatus comprising a processor and a memory, the processor configured to:

receive system information indicating a first priority of cell reselection for each network slice from a base station, receive information indicating a cell reselection priority that is not associated with a network slice from the base station, receive from a core network apparatus, slice information including information identifying a plurality of network slices and information indicating a second priority of each network slice among the plurality of network slices, and perform cell reselection, wherein the cell reselection comprises:

determining that a frequency supporting a network slice has higher priority than a frequency not supporting a network slice;

applying to a frequency supporting a network slice with the highest second priority indicated by the slice information, the first priority indicated by the system information corresponding to the network slice; and applying to a frequency not supporting any network slice indicated by the slice information, the cell reselection priority indicated by the information indicating a cell reselection priority that is not associated with a network slice.

* * * * *